United States Patent
Ollila et al.

(10) Patent No.: US 6,807,074 B2
(45) Date of Patent: Oct. 19, 2004

(54) CONTROL OF AN INVERTER

(75) Inventors: Jaakko Ollila, Pirkkala (FI); Risto Komulainen, Klaukkala (FI)

(73) Assignee: Vacon Oyj, Vaasa (FI)

( * ) Notice: Subject to any disclaimer, the term of this patent is extended or adjusted under 35 U.S.C. 154(b) by 0 days.

(21) Appl. No.: 10/438,826

(22) Filed: May 16, 2003

(65) Prior Publication Data

US 2003/0214827 A1 Nov. 20, 2003

(30) Foreign Application Priority Data

May 17, 2002 (FI) ............................................. 20020933

(51) Int. Cl.$^7$ .............................................. H02M 1/12
(52) U.S. Cl. ....................................... 363/41; 307/127
(58) Field of Search ....................... 363/41, 40; 307/127

(56) References Cited

U.S. PATENT DOCUMENTS

| | | | |
|---|---|---|---|
| 4,829,416 A | * 5/1989 | Inaba et al. ................... | 363/41 |
| 4,905,135 A | 2/1990 | Unehara et al. | |
| 5,880,950 A | 3/1999 | Kim | |
| 5,990,658 A | * 11/1999 | Kerkman et al. ........... | 318/811 |

FOREIGN PATENT DOCUMENTS

| | | |
|---|---|---|
| JP | 0 469 872 A2 | 2/1992 |
| JP | 7-177754 A | 7/1995 |

* cited by examiner

Primary Examiner—Shawn Riley
(74) Attorney, Agent, or Firm—Birch, Stewart, Kolasch & Birch, LLP

(57) ABSTRACT

An inverter control unit having a bridge circuit provided with controllable semiconductor switches in upper and lower circuit arms, which bridge circuit converts a direct voltage to be fed to the inverter into an alternating voltage of variable frequency and amplitude, said control unit controlling the semiconductor switches by pulse-width modulation (PWM) to generate an inverter output voltage, and said control unit comprising a first control section (21) at ground potential and a second control section (22) at the potential of the semiconductor switches, galvanically isolated channels being provided between said sections for serial transmission of control data from the first control section to the second control section and of feedback data from the second control section to the first control section. A modulation circuit controlling the semiconductor switches is disposed in the second control section (22) at the potential of the semiconductor switches, and the modulation circuit forms the time integral of the difference between the reference and actual values ($U_{uref}$, $U_{uact}$) of the phase voltages of the inverter, compares this difference to positive and negative limits ($L_+$, $L_-$) and when the time integral exceeds the positive or the negative limit, drives the phase switch in the upper or lower arm of the phase in question into conduction.

8 Claims, 3 Drawing Sheets

Fig. 2

Figure 1:
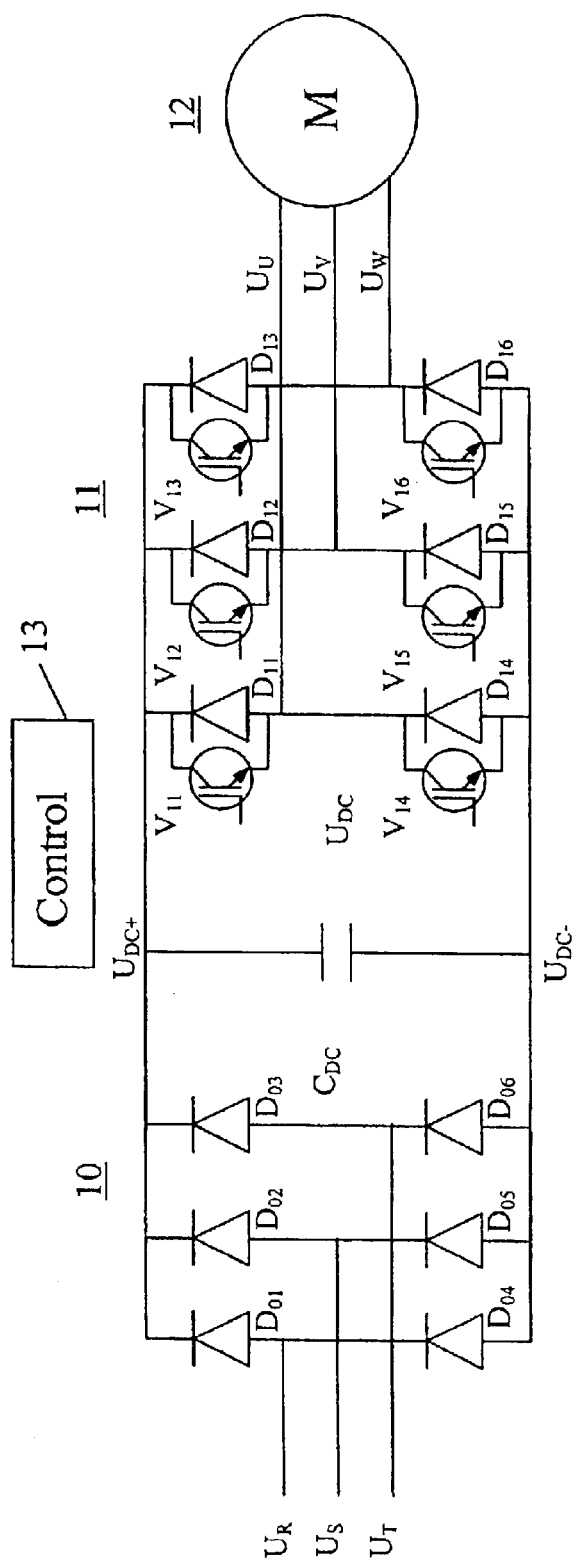

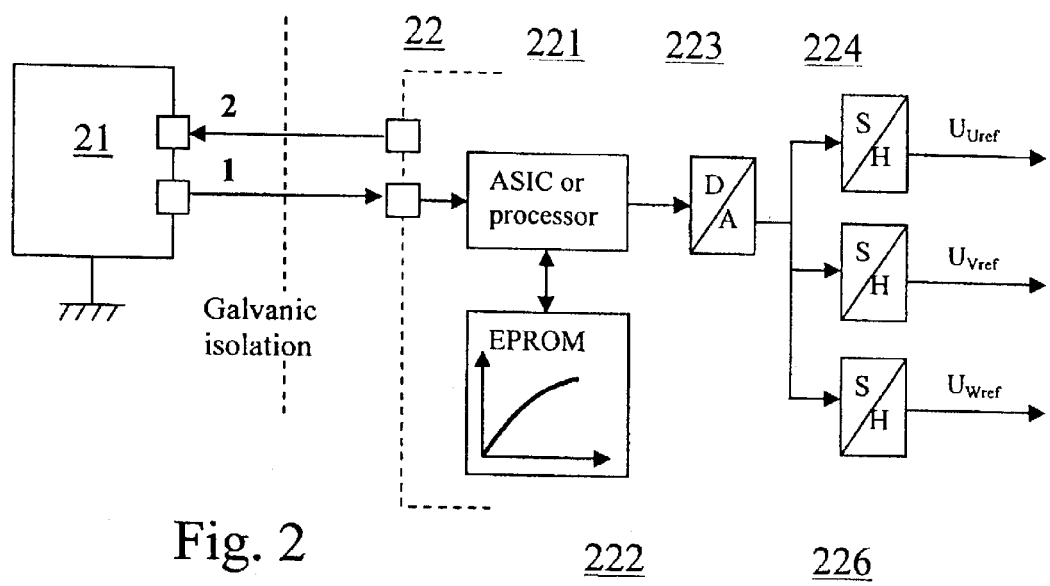
Fig. 2
Fig. 3
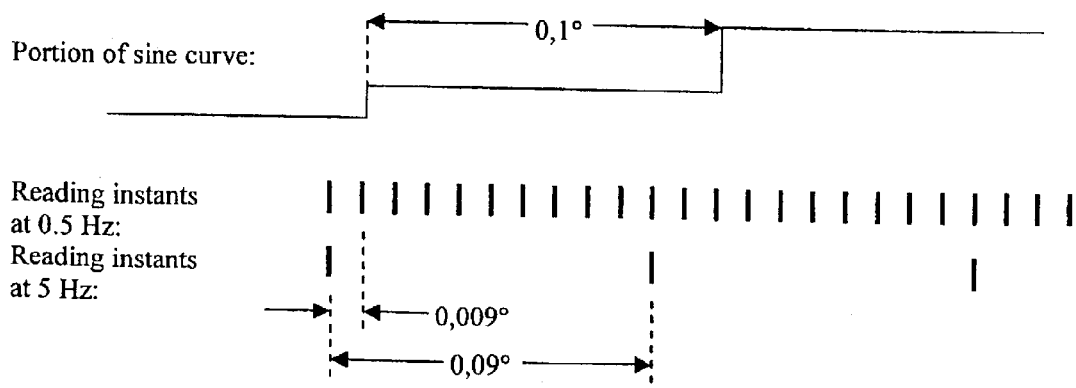

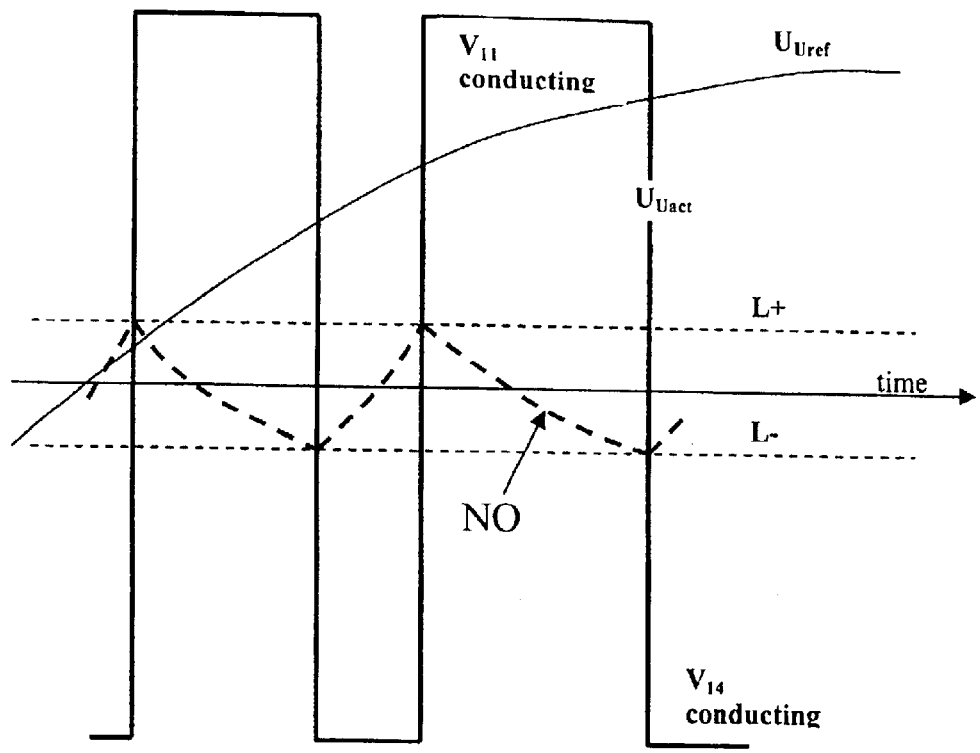
Fig. 5
Fig. 4
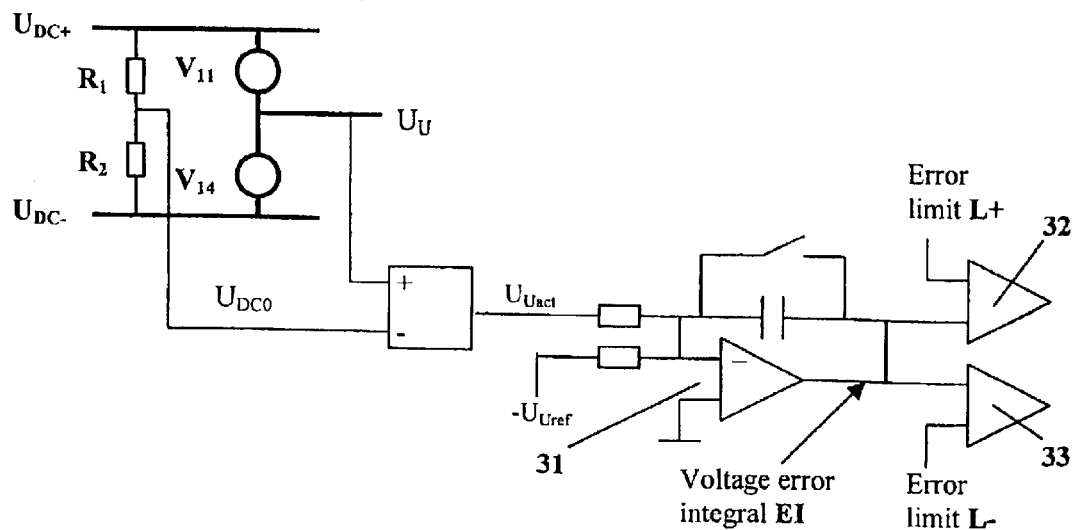

US 6,807,074 B2

CONTROL OF AN INVERTER

The present invention relates to a control unit for controlling an inverter having a bridge circuit provided with controllable semiconductor switches, which bridge circuit converts a direct voltage fed to the inverter into an alternating voltage of variable frequency and amplitude, said control unit controlling the semiconductor switches by pulse-width modulation (PWM) to produce an output voltage of the inverter.

The invention relates especially to a PWM inverter control arrangement which comprises a control circuit at ground potential used e.g. for a customer interface and a control circuit at main circuit potential, containing e.g. measuring circuits and circuits producing control signals for power semiconductor switches.

Such an inverter is applicable for use e.g. in a frequency converter in which the alternating voltage of a three-phase supply network is rectified by a rectifier circuit to produce an intermediate circuit direct voltage and then inverted by means of an inverter to produce a three-phase alternating voltage of variable frequency and amplitude for feeding e.g. a three-phase cage induction motor.

PWM frequency converters are generally used to control the rotational speed of a cage induction motor, which is the commonest motor type in industry. An output voltage of variable amplitude and frequency is generated by means of the power semiconductor switches of an inverter. For the control of the power semiconductor switches, pulse amplifier circuits at main circuit potential, i.e. at the potential of the power semiconductor switches are needed. To produce a correct output voltage, it is necessary to use measuring circuits, which are normally also at main circuit potential.

The control circuit processing the signals pertaining to the customer interface again has to be at ground potential for reasons of safety. Therefore, galvanic isolation is required between the control circuit unit at ground potential and the control circuits at main circuit potential.

A common practice for providing galvanic isolation between the units is to use serial communication via optoisolators or optical fibers. Such an arrangement is known e.g. from patent specification EP0469872, which discloses a system for the control of an adjustable-frequency AC inverter using two serial data channels: one channel for transmitting reference values to a control circuit at main circuit potential and a second channel for transmitting measurement and other feedback data to a control circuit at ground potential.

The pulse pattern of the voltage produced by the inverter is normally computed either by a microprocessor or an ASIC circuit designed for this purpose. The generation of the pulse pattern is normally based on a predetermined algorithm, e.g. a sine-triangle comparison. The modern efficient microprocessors allow both the functions required for the control of the customer interface and the functions needed for controlling the main circuit to be performed by the same processor, which is normally placed in a the control unit section at ground potential.

The generation of a pulse pattern implemented in the aforesaid manner involves the problem that the pulse pattern actually produced in the output voltage is not exactly of the desired form. Deviations arise e.g. from signal processing delays in the pulse amplifiers, switching delays in the power semiconductor switches and the required so-called dead time between the conduction periods of the upper and lower arms of the phase switch. Further errors result from a fast variation of the d.c. intermediate circuit voltage. Especially at low frequencies, at which a large number of switching actions occur during a single cycle of the output voltage, the errors clearly distort the output voltage.

The voltage error can be compensated by measuring the output voltage produced and taking the error into account in connection with the next switching instant. Especially if the pulse pattern is generated at ground potential, the large voltage difference requires the use of difficult and expensive measuring circuits which reduce the ground impedance of the device and may cause problems in the earth-leakage monitoring circuits of the supply network.

The object of the present invention is to achieve a control system for the control of a PWM-controlled inverter that is better than prior-art solutions, in which system the output voltage is always correct regardless of frequency, power-stage dead time or variations of the intermediate circuit voltage, wherein the phase switches do not have to perform any unnecessary actions, the switching losses being thereby reduced, wherein the angle of the output voltage vector is continuously known, allowing easier motor adjustment especially in difficult applications, and wherein the distribution of tasks between the control unit at ground potential and the control unit at main circuit potential is natural, so that no difficult main circuit measurements are needed and no ground impedance problems caused by them arise.

In the control system of the invention, this is achieved by calculating in the control unit section at ground potential the instantaneous value of the voltage vector of the output phases, which value is transmitted in serial format over a galvanically isolated channel to the control unit section at main circuit potential, where the modulation, i.e. determination of the phase switch positions is carried out by forming the time integral of the difference between the reference and actual values of the phase voltages, comparing this difference to a positive limit and a negative limit, and if the time integral exceeds the positive or the negative limit, the phase switch is turned accordingly either to the up position or to the down position.

In an embodiment of the control system of the invention, the angle and amplitude of the output voltage vector is given in the channel between the galvanically isolated control circuits.

In a second embodiment of the control system of the invention, the reference values of the instantaneous voltages of at least two phase voltages are given in the channel between the galvanically isolated control circuits.

The features of the invention are presented in detail in the claims below.

In the following, the invention will be described in detail by the aid of an example with reference to the attached drawings, wherein FIG. 1 represents a PWM frequency converter comprising a rectifier, a direct-voltage intermediate circuit, a control unit and an inverter according to the invention, FIG. 2 visualizes the serial data traffic and the generation of phase voltages in the control unit, FIG. 3 visualizes the reading of a sine curve, FIG. 4 visualizes the modulation, i.e. determination of the phase switch positions, and FIG. 5 represents the voltage reference, error integral, error limits and inverter output voltage pulses.

FIG. 1 represents a prior-art voltage-controlled three-phase PWM frequency converter comprising a rectifier bridge 10 for the rectification of a three-phase alternating voltage consisting of phase voltages $U_R$, $U_S$, $U_T$ to produce an intermediate circuit direct voltage $U_{DC}$ and an inverter bridge 11 for DC/AC conversion of the intermediate circuit direct voltage into a three-phase alternating voltage of variable frequency and amplitude having phase voltages $U_U$, $U_V$, $U_W$. The frequency converter feeds a three-phase cage induction motor (M) 12. The inverter bridge 11 is a full-wave bridge having in the upper and lower arms of the three phases controllable semiconductor switches $V_{11}$–$V_{16}$ with diodes $D_{11}$–$D_{16}$ connected in inverse-parallel with them. The inverter control unit 13 controls the semiconductor switches $V_{11}$–$V_{16}$ of each phase ($V_{11}$, $V_{14}$ in phase U; $V_{12}$, $V_{15}$ in phase V, and $V_{13}$, $V_{16}$ in phase W) by pulse-width modulation.

FIG. 2 represents the inverter control unit 13, in which the outward interface part 21 of the control system is grounded and galvanically isolated from the control functions 22 immediately relating to the main circuit by means of two optically isolated serial data channels 1 and 2, implemented e.g. using optical fibers. One of the channels is used for the transmission of reference values to the control unit at main circuit potential and the other for the transmission of feedback data. In addition to the functions relating to the customer interface, control unit section 21 also takes care of actions relating to the adjustment of the output voltage, such as the computations relating to motor adjustment, actions associated with supply network failures, etc., and sends the values of the output voltage vector obtained as a final result to the control circuits 22 of the main circuit.

Control unit section 22 performs the modulation, i.e. the determination of the phase switch positions, main circuit measurements and actions relating to immediate protection of the power stage.

Of the two optically isolated channels between the control unit and the main circuit, channel 1 is used for transmitting reference values by giving the angle and amplitude of the output voltage vector during operation, instead of which it is also possible give the instantaneous values of the phase voltages. The reference values are given precisely at predetermined intervals, e.g. at every 50 μs. The direction of rotation of the vector angle also determines the direction of rotation of the motor. In addition to the transmission of reference values channel 1 can also be used for other actions, such as carrying out inquiries concerning the power stage in connection with start-up and giving a switching frequency reference and start/stop data.

Channel 2 is used for the transmission of feedback signals: motor currents, DC voltage, temperatures and malfunction and warning notices during operation and for responding to inquiries relating to the power stage in connection with start-up.

When channel 1 transmits the angle and amplitude of the output voltage vector, the unscaled instantaneous values of the phase voltages are read from memory on the basis of an angle reference and multiplied by an amplitude reference. If the sinusoidal phase voltage reference curve is combined with the $3^{rd}$ harmonic, which is a well-known expedient used to achieve a larger output voltage, then the quarter period (90°) values of the sine curve have to be programmed in memory. If the sine curve is not combined with the $3^{rd}$ harmonic, only the 60° values have to be stored in memory.

The table below and FIG. 3 present an example of reading the sine curve if the curve has been saved at 0.1° intervals and it is read at 50 μs intervals, using a few different initial frequency values f. In the table, T is the output voltage cycle time calculated from the formula T=1/f, and α is the angle corresponding to a 50 μs period in the output voltage, calculated from the formula α=50 μs/T*360°:

TABLE 1

| f [Hz] | T [ms] | α [°] |
|---|---|---|
| 0.5 | 2000 | 0.009 |
| 5 | 200 | 0.09 |
| 50 | 20 | 0.9 |
| 500 | 2 | 9 |

The readings obtained from the memory 222 are multiplied in a microcircuit 221 by the amplitude reference and D/A-converted in a converter 223 to produce in reference value units 224, 225 and 226 analog instantaneous-value references $U_{Uref}$, $U_{Vref}$ and $U_{Wref}$ of the phase voltages when the $3^{rd}$ harmonic has been mixed with the sine curve to reach a full output voltage. If the $3^{rd}$ harmonic has not been mixed with the sine curve, it is sufficient to D/A convert the instantaneous value references, the $3^{rd}$ phase voltage being obtained by summing.

The modulation, i.e. determination of the positions of the phase switches $V_{11}$–$V_{16}$ is performed by coupling as presented in FIG. 4 as follows e.g. for phase U:

1. The actual value $U_{Uact}$ of the phase voltage is formed by measuring the voltage between the output voltage $U_U$ produced by the inverter and the midpoint of the intermediate circuit voltage $U_{DC}$ (between resistors $R_1$ and $R_2$).
2. In an integrator 31 composed of amplifier circuits, the time integral EI of the difference (=voltage error) between the phase voltage reference $U_{Uref}$ and the actual value $U_{Uact}$ of the phase voltage is formed. It is compared in a comparator 32, 33 to a positive and a negative error limit $L_+$, $L_-$.
3. If the error integral EI exceeds +-error limit $L_+$, then an upper-arm switch, e.g. $V_{11}$ is turned on, and similarly when the integral falls below --error limit $L_-$, a lower-arm switch, e.g. $V_{14}$ is turned on (FIG. 5).
4. The magnitude of the error limits is determined by a switching frequency reference; the larger the range between the limits, the lower is the switching frequency. A separate controller takes care of the limits in accordance with the switching frequency reference, which is given by the control unit in connection with start-up.
5. As is known, simultaneous turning of two phase switches may produce larger than normal overvoltages in the motor, so it is preferable to avoid such a situation. If at the instant at which a given switch should be turned some other switch is being turned or the dead time following switching has not yet elapsed, then the turning of the switch in question is delayed until the relevant time has elapsed. The error integral EI does exceed the limit for an instant, but the error is compensated by the next switching instant.
6. In certain situations, such as e.g. in the stop state, the error integral has to be reset by a switch connected across an integrating capacitor.

It is obvious to the person skilled in the art that different embodiments of the invention are not limited to the example described above, but that they may be varied within the scope of the claims presented below. The computation relating to the magnitude and frequency of the output voltage can also be carried out e.g. in the control circuits 22 of the main circuit and the above-described analog generation of error integrals can also be performed digitally e.g. by taking samples of the actual values measured by an A/D converter and executing an integration and a comparison e.g. by means of a microprocessor.

What is claimed is:

1. Inverter control unit having a bridge circuit provided with controllable semiconductor switches ($V_{11}$–$V_{16}$) in upper and lower circuit arms, which bridge circuit converts a direct voltage ($U_{DC}$) to be fed to the inverter into an alternating voltage ($U_U$, $U_V$, $U_W$) of variable frequency and amplitude, said control unit controlling the semiconductor switches by pulse-width modulation (PWM) to generate an inverter output voltage, and said control unit comprising a first control section (21) at ground potential and a second control section (22) at the potential of the semiconductor switches, galvanically isolated channels being provided between said sections for serial transmission of control data from the first control section to the second control section and of feedback data from the second control section to the first control section,
characterized in that a modulation circuit controlling the semiconductor switches ($V_{11}$–$V_{16}$) is disposed in the second control section (22) at the potential of the semiconductor switches, and that the modulation circuit forms the time integral of the difference between the reference and actual values ($U_{Uref}$, $U_{Uact}$) of the phase voltages of the inverter and compares this difference to positive and negative limits ($L_+$, $L_-$) and when the time integral exceeds the positive or the negative limit, drives the phase switch in the upper or lower arm of the phase in question into conduction.

2. Control unit according to claim 1, characterized in that the second control section (22) contains a circuit for forming the actual values of the phase voltages, which circuit forms the actual values of the phase voltages from between the output voltages of the output phases of the inverter and the midpoint of the intermediate circuit voltage of the frequency converter.

3. Control unit according to claim 1, characterized in that the computation circuit associated with the magnitude and frequency of the output voltage is disposed in the first control section (21).

4. Control unit according to claim 1, characterized in that, in the channel (1, 2) between the galvanically isolated control unit sections, the angle and amplitude of the output voltage vector are given.

5. Control unit according to claim 1, characterized in that the reference values of the instantaneous voltages of at least two phase voltages are given in the channel (1, 2) between the galvanically isolated control circuits.

6. Control unit according to any one of claim 1 or 4, characterized in that, on the basis of an output voltage vector reference it has received, the second control section (22) forms the references for the instantaneous values of two output voltages by reading on the basis of the angle data the voltage values from a memory circuit (222) and multiplying the result by the vector amplitude data, and that the voltage data are converted into analog form by a D/A converter (223), and that the third phase voltage reference is formed by a summing unit (226) from the sum of the aforesaid two references.

7. Control unit according to any one of claim 1 or 4, characterized in that, on the basis of an output voltage vector reference it has received, the second control section (22) forms the references for the instantaneous values of each output voltage by reading on the basis of the angle data the voltage values from a memory circuit (222) and multiplying the result by the vector amplitude data, and that the voltage data are converted into analog form by a D/A converter (223).

8. Control unit according to claim 1, characterized in that the computation circuit associated with the magnitude and frequency of the output voltage is disposed in the second control section (22).

* * * * *